July 3, 1934.  E. B. PERRINE  1,964,998
FISHING REEL
Filed Aug. 14, 1931
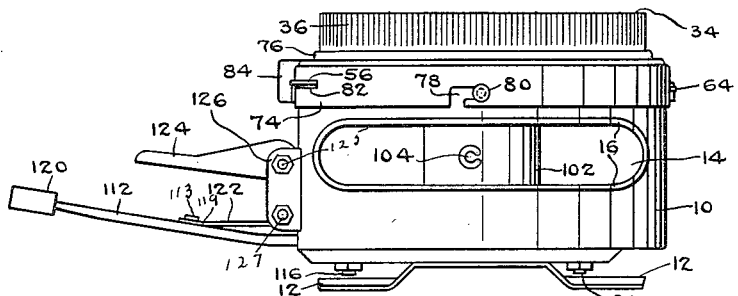
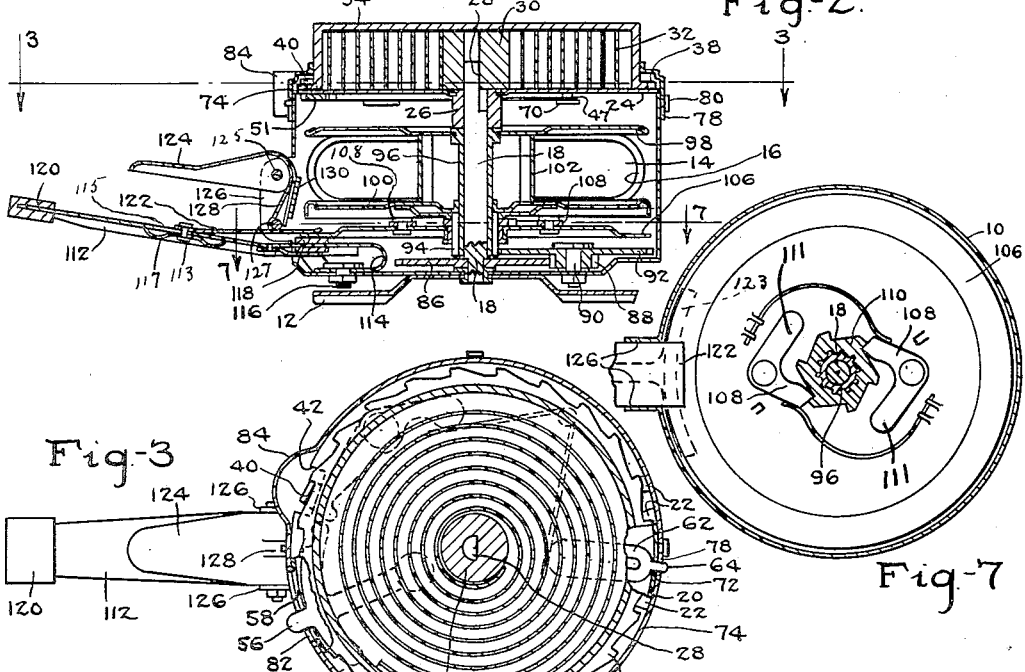
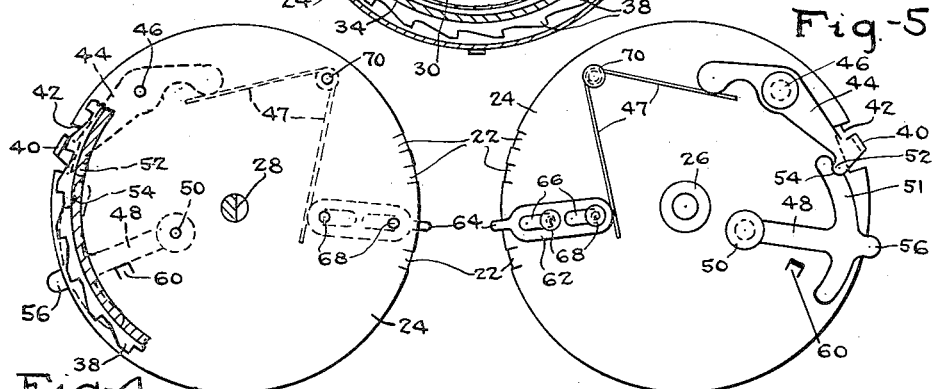
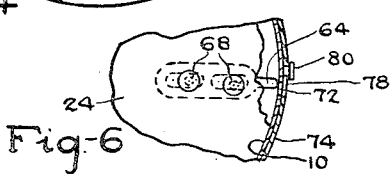
Inventor:
Emmett B. Perrine
By Whiteley and Ruckman
Attorneys.

Patented July 3, 1934

1,964,998

UNITED STATES PATENT OFFICE 1,964,998
FISHING REEL

Emmett B. Perrine, Los Angeles, Calif., assignor to Perrine Manufacturing Co., Minneapolis, Minn.

Application August 14, 1931, Serial No. 556,967

12 Claims. (Cl. 242—84.3)

My invention relates to fishing reels, and an object in general is to improve upon the construction disclosed and claimed in my Patent No. 1,810,573 dated June 16th, 1931. Among the special objects of the invention are the provision of winding drum release ratchet mechanism which is normally locked in inoperative position to prevent accidental or improper releasing of the spring tension; the provision of a drum-retaining ring with means for locking said ring to the shell of the reel so that accidental disengagement cannot occur; the provision of an outwardly extending boss on the retaining ring which not only provides a covering for the ratchet pawl but provides space for disengagement of the latter whereby the winding drum may have substantially the full diameter of the ring; the provision of a disk for carrying, locking and releasing mechanism and means for detachably securing said disk in place between the shell and winding drum; and the provision of means for holding the line spool in place in the shell which means may be moved into releasing position to permit the spool to be readily removed from the shell.

The full objects and advantages of my invention will appear in connection with the detailed description thereof, and the novel features of my inventive idea will be particularly pointed out in the claims.

In the accompanying drawing which illustrates a practical embodiment of my invention,—Fig. 1 is an elevational view of the device. Fig. 2 is a view in central vertical section. Fig. 3 is a view in horizontal section on the line 3—3 of Fig. 2 with the device in its operative position. Fig. 4 is a view corresponding partly to Fig. 3 showing a pawl or dog moved outwardly. Fig. 5 is a bottom plan view of a disk which carries the pawl and showing the pawl locked in disengaged position. Fig. 6 is a fragmentary view showing a retaining ring in unlocked position. Fig. 7 is a view in section on the line 7—7 of Fig. 2. Fig. 8 is a fragmentary sectional view showing a line guide structure.

Referring to the construction shown in the drawing, the numeral 10 designates a shell or casing to the bottom of which reel seat members 12 are secured for attaching the reel to a fishing rod. Two opposite sides of the shell are provided with openings 14 for right hand or left hand use. The edges of these openings have stainless steel line guides 16 secured thereto as by crimping. The shell 10 and also a spool and levers which will be referred to later are preferably made of tempered duralumin. The lower end of a main shaft 18 is rotatably mounted in a bearing formed at the center of the bottom of the shell. The upper end of the shell is open and the edges thereof are provided with notches 20 which receive lugs 22 struck downwardly from the margin of a disk 24 whereby this disk which has a diameter the same as the outside diameter of the shell is prevented from rotative movement with relation to the shell. The center of the disk 24 is provided with a bearing 26 through which the shaft 18 passes loosely. The upper portion of the shaft 18 above the bearing 26 is provided with a flat side 28 adapted to cooperate with a corresponding flat hole in a hub member 30 whereby the shaft and the hub member are caused to rotate together. The inner end of a main spring 32 is secured to the hub member 30 while the outer end of this spring is secured to the inside of a drum or cap 34, the outer surface of which is milled as indicated at 36 in order that the drum may be readily turned for winding the spring. The lower peripheral edge of the drum 34 is provided with outwardly projecting ratchet teeth 38 with which a pawl tooth 40 is adapted to cooperate. The pawl tooth 40 extends upwardly through a notch 42 formed in the periphery of the disk 24 and is carried at one end of a lever 44 intermediately pivoted at 46 to the lower surface of the disk 24. The pawl 40 is normally held in operative position by a spring 47 which at one end engages in a notch in the end of the lever 44 which is opposite the end thereof from which the tooth 40 is bent upwardly. A ratchet release arm 48 is pivoted at 50 to the underside of the disk 24. The arm 48 toward its outer end carries an arcuate member 51, the free end of which normally engages against the end of the lever 44. When the pawl tooth 40 is moved outwardly from engagement with the ratchet teeth 38, the arm 48 may be turned so that a rounded projection 52 on the lever 44 engages in a rounded notch 54 formed in the member 51. In order to thus turn the arm 48, the outer end 56 thereof projects through a notch 58 formed in the upper margin of the shell 10. When the arm 48 is turned in the opposite direction, the projection 52 is caused to ride out of the notch 54 and the pawl tooth 40 is restored to operative engagement with the ratchet teeth 38 by the action of the spring 47. A stop 60 on the lower side of the disk 24 serves to limit the backward movement of the arm 48. The underside of the disk 24 also carries a slide 62, the outer end of which is provided with a locking pin 64. The slide 62 has two slots 66 which respectively receive two studs 68 secured in radial relation to the disk 24. The spring 47 previously referred to is anchored at its middle portion to a stud 70 carried by the disk 24 and one end of this spring engages in a notch formed in the inner end of the slide 62 so that the pin 64 is normally held in outward position projecting through a hole 72 near the upper margin of the shell 10. The slots 66 are somewhat wider than the shanks of the studs 68 so that the pin 64 in addition to a radial movement is capable of a slight rocking movement which has an important purpose when the slide 62 is retracted to release the pin as will appear later.

When the device is in assembled condition, the ratchet teeth 38 rest upon the upper surface of the disk 24 as previously intimated. In order to hold the drum 34 for proper rotative movement, upon the disk 24, a drum retaining ring 74 is provided, the upper edge of this ring being beaded inwardly as indicated at 76 for engagement over the ratchet teeth 38. The lower margin of the ring 74 is provided with a number of bayonet slots 78 adapted to receive outwardly extending studs 80 carried near the upper margin of the shell 10 so that the ring may be secured to the shell by a slight turning movement. The ring 74 has a circumferential slot 82 adapted to register with the slot 58 and through which the end 56 of the arm 48 extends so as to be accessible to the operator. The ring 74 also has an outwardly struck boss 84 adjacent the notch 42 in the disk 24 which boss provides space for the pawl 40 to be moved outwardly from engagement with the ratchet teeth 38. This boss provides a covering for the pawl 40 and also permits making the drum 34 substantially the full diameter of the ring 74. It will be noted from Fig. 3 that the locking pin 64 when the device is assembled, is located adjacent one of the studs 80 so as to enter the cooperating bayonet slot 78 and lock the ring 74 in place in a manner which will be referred to later.

A primary gear 86 is secured to the lower portion of the shaft 18 within the bottom of the shell 10, this gear meshing with a pinion 88 rotatable on an axis 90 carried by the bottom of the shell. The pinion 88 is secured in concentric relation to an intermediate gear 92 which meshes with a pinion 94 secured to the lower end of a sleeve 96 rotatable on the shaft 18. This sleeve is secured to the upper and lower heads 98 and 100 of a spool 102 having a tongue 104 to which the inner end of a fishline may be secured. A brake disk 106 is rotatably mounted on the sleeve 96 between the pinion 94 and the lower head 100, being held in spaced relation below the latter. The disk 106 carries spring pressed pawls 108 pivotally mounted on its upper side, these pawls engaging ratchet teeth 110 carried by the sleeve 96 so that the spool can rotate in one direction only with relation to the brake disk 106.

As shown in Fig. 7, the pawls 108 have counterweighted back ends 111. When the spool is spinning around rapidly, centrifugal force acting upon the counter-weighted ends 111 causes the pawls to be held in engagement with the periphery of the ratchet 110. This is a matter which is of considerable importance when a prospective customer operates the reel with no line on the spool. In case he winds up the main spring quite tightly, then releases the brake to see the spool spin, and then sets the brake suddenly thus stopping the disk 106 while the spool and the ratchet continue to rotate, the pawls are pressed back to the ratchet by the springs associated with the pawls. In the absence of the counterweights just referred to, the pawls are apt to strike the teeth of the ratchet 110 too abruptly. In other words the counterweights hold the pawls in continuous engagement with the ratchet so that they do not move out therefrom and get a return action to strike the ratchet teeth too suddenly. Also, by the use of the counterweights the tension on the line is reduced, which gives much freerer action when stripping the line.

In order to manually control the rotation of the spool for winding in the line, the marginal portion of the brake disk 106 is gripped or released as desired, by means of a manually operable brake device. As shown, this device includes a brake lever 112 having a backwardly bent inner end 114 secured to the bottom of the shell by a screw bolt 116. The lever 112 carries a brake shoe 118 which is normally held in braking engagement with the lower marginal portion of the brake disk 106 by spring action of the bent portion 114 and an upwardly bowed spring 123 engaging under the body portion of the lever just inside of the shell 10. The outer end of the lever 112 carries a rubber tip 120 which is pressed downwardly to release the brake when it is desired to wind in the line. The lever 112 carries a slide 122 which when pushed inwardly enters between the disk 106 and the lower spool head 100. It will be understood from Fig. 3 that the spool 102 and the brake disc 106 are held in proper position on the sleeve 96 and cannot be separated therefrom even when the parts of the device are disassembled. Since the disc 106 cannot be removed from the sleeve 96, it is obvious that for disassembling the device the spool can be slid off the shaft 18 only when the slide 122 is pushed outwardly to disengage from the disc 106.

The slide 122 is adapted for sliding movement lengthwise of the lever 112 due to the fact that a stud 113 secured to the outer end of the slide extends through a slot 115 in the lever with a leaf spring 117 secured to the stud and engaging the lower surface of the lever. The end of the slide 122 to which the stud 113 is secured is bent up at an angle as best shown in Fig. 1 and a rib formed at the angle 119 is adapted to engage a slight depression in the upper surface of the lever 112 when the slide is moved into its inward position. This prevents the slide from being accidentally moved outwardly. An auxiliary brake lever 124 is pivoted upon a small bolt 125 secured to the upper ends of lugs 126 struck outwardly from the shell 10. The lower ends of the lugs 126 carry a small bolt 127 secured thereto. A spring member 128 cut from the lever 124 has its free end attached to the bolt 127 so that the lever is normally held upwardly to thereby keep a shoe 130 carried by the inner end of the lever out of engagement with the periphery of the lower spool head 100. For the purpose of snubbing the spool, the lever 124 is depressed so as to bring the shoe 130 into engagement with the spool head 100. The slide 122 normally bears against the lower bolt 127 so that the inner end of the slide is caused to bear upon the upper surface of the brake disk 106. When the lever 112 is depressed, the inner end of the slide 122 is moved up from engagement with the upper surface of the disk 106 at the same time that the brake shoe 118 is moved from engagement with the lower surface of this disk. The spring 117 acting in connection with the upwardly bent outer end of the slide causes this upward movement of the inner end of the slide.

By referring to Fig. 8, it will be understood that the material of the shell 10 around the margins of the openings 14 is bent outwardly. When the line guides 16 are secured to these margins by crimping as previously stated, the guides are flush with the inner surface of the shell since the extent of recessing or outward bending of the shell is equal to the thickness of the line guide. This construction provides for minimum clearance between the spool and shell with no wide open spaces for the line to enter and get off the spool. The line guides may be made from sheet stock, which permits of obtaining smooth rounded edges so that the line is protected from abrasion when the guides are crimped into place as previously stated.

The operation and advantages of my invention will be readily understood in connection with the foregoing description. The brake including the shoe 118 and the slide 122 is normally on and holds the brake disk 106 from turning. But since the spool is connected to this disk through ratchet mechanism, the spool is free to rotate in the direction for paying out the line except for the resistance to said rotation by the main spring 32, it being understood that this spring is being wound up as the line is running out. When the brake is released, the spring 32 rotates the spool to wind the line thereon. In order to remove the drum 34 and spring 32 attached thereto, the locking pin 64 is pressed in through the shell and rocked over toward the adjacent stud 80 so as to engage inside of the shell. The ring 74 may then be turned to release it from the studs 80 whereupon the ring and drum may be removed separately from the shell. It will be noted that the pin 64 when it extends out through the hole in the shell also serves to hold the disk 24 in place on the shell and that when this pin is pushed in, the disk 24 is released so that it can be removed from the shell. This exposes the spool which can then be removed from the shell upon moving the slide 122 outwardly which may be readily done when the lever 112 is pressed downwardly. By now turning the shell upside down, the spool and brake disc 106 held together by sleeve 96 will drop out. In order to re-assemble the device, the spool together with the brake disc is put in position on the shaft 18 and turned to insure that the gears go into mesh. The disk 24 is then put in place with the lugs 22 fitting into the proper notches 20 and the pin 64 is allowed to extend out through the hole in the shell. The drum 34 is placed in position taking care that the flat wall of the hole in the hub 30 engages the flat side 28 of the shaft 18. The retaining ring 74 is then placed so that the slot 82 fits over the outer end 56 of the release arm 48 and the ring is dropped down upon the studs 80, the pin 64 being pushed in so that the ring will pass over it. The ring is then turned to locking position on the studs 80 and the pin 64 will spring out and lock the ring securely in place on the shell. When the slide 122 is pushed inwardly, the brake lever 112 preferably being depressed at this time, the inner end portion of this slide enters between the spool head 100 and the brake disk 106. Upon removing the downward pressure on said lever, not only does the brake shoe 118 come into engagement with the lower surface of the disk 106 but the inner end portion of the slide 122 comes into engagement with the upper surface of said disk so that the marginal portion thereof is gripped between the shoe and the slide.

In order now to wind the line on the reel, the inner end of the line is attached to the tongue 104 of the spool and the main spring is wound up by giving the drum 34 several turns. The brake lever 112 is then depressed to wind the first portion of the line and these operations are repeated until the line is fully wound on the spool. The tension of the main spring is released and then the drum is given about two turns to provide the proper spring tension for casting. In order to release the spring tension, the drum is held in the palm of the hand and turned slightly to the right to force the pawl 40 outwardly, the ratchet release arm 48 at the same time being pressed to the right to place the pawl 40 in "off" position. The drum is then permitted to revolve slowing in the hand until the main spring is entirely unwound. This operation gives a free spool until the release arm 48 is pressed to the left to restore the pawl 40 to "on" position, whereupon turning of the drum the proper amount will again place the main spring under the desired tension.

I claim:

1. In a fishing reel, the combination of a line spool, a motor spring for operating said spool, a member for winding said spring, pawl and ratchet mechanism for normally holding said member for wound-up condition of said spring, and a device adapted to hold pawl and ratchet mechanism in disengaged condition operable only after said pawl has been moved toward disengaging position relatively to said ratchet.

2. In a fishing reel, the combination of a line spool, a motor spring for operating said spool, a winding drum to which the outer end of said spring is attached, ratchet teeth on said drum, a pawl normally in engagement with said ratchet teeth, and a movable member adapted to hold said pawl in disengaged condition operable only after said pawl has been moved toward disengaging position relatively to said ratchet.

3. In a fishing reel, the combination of a line spool, a motor spring for operating said spool, a winding drum to which the outer end of said spring is attached, peripheral ratchet teeth extending from said drum, a spring-pressed pawl normally in engagement with said ratchet teeth, and a movable member adapted to hold said pawl in disengaged condition operable only after said pawl has been lifted by movement of one of said ratchet teeth.

4. In a fishing reel, the combination of a shell, a line spool mounted in said shell, a disk held upon the upper end of said shell, a motor spring mounted above said disk for operating said spool, a winding drum to which the outer end of said spring is attached, ratchet teeth extending around the lower edge of said drum, a spring-pressed pawl pivoted to said disk normally in engagement with said ratchet teeth, and a device adapted to hold said pawl in disengaged condition operable only after said pawl has been lifted by movement of one of said teeth.

5. In a fishing reel, the combination of a shell, a line spool mounted in said shell, a disk held upon the upper end of said shell, a motor spring mounted above said disk for operating said spool, a winding drum to which the outer end of said spring is attached, ratchet teeth extending around the lower edge of said drum, a spring-pressed pawl pivoted to said disk normally in engagement with said ratchet teeth, a release arm pivoted to said disk, an extension carried by said arm which butts against the end of said pawl when the latter is in operative condition, said extension having a notch, and a projection carried by said pawl adapted to be engaged in said notch to hold said pawl in disengaged condition after the latter has been moved outwardly.

6. In a fishing reel, the combination of a shell, a line spool mounted in said shell, a disk held upon the upper end of said shell, a motor spring mounted above said disk for winding said spool, a winding drum to which the outer end of said spring is attached, ratchet teeth extending outwardly from the lower edge of said drum, a spring-pressed pawl pivoted to said disk normally in engagement with said ratchet teeth, a retaining ring adapted to attach said winding drum rotatably to said shell, and an outwardly extending boss on said ring within which said pawl is adapted to operate.

7. In a fishing reel, the combination of a shell, a line spool mounted in said shell, a disk held upon the upper end of said shell, a motor spring mounted above said disk for operating said spool, a winding drum to which the outer end of said spring is attached, a retaining ring adapted to rotatably engage said winding drum, said ring having bayonet slots in its lower portion, studs extending out from the upper portion of said shell for cooperation with said slots, and a spring-pressed locking pin carried by said disk adapted to snap into one of said slots when said studs have been engaged in said slots.

8. In a fishing reel, the combination of a shell, a line spool mounted in said shell, a disk held upon the upper end of said shell, a motor spring mounted above said disk for operating said spool, a winding drum to which the outer end of said spring is attached, a retaining ring adapted to rotatably engage said winding drum, said ring having bayonet slots in its lower portion, studs extending out from the upper portion of said shell for cooperation with said slots, said shell having a perforation adjacent one of said slots, and a spring-pressed locking pin mounted on said disk for both radial and rocking movement whereby said pin is adapted to snap through said opening into the slot adjacent said stud when said studs have been engaged with said slots.

9. In a fishing reel, the combination of a shell, a line spool rotatably mounted in said shell, a rotatable member, a ratchet device between said member and said spool which causes said member to rotate when said spool rotates in the direction to wind the line on said spool and which permits independent movement between said member and said spool when the latter rotates in reverse direction, a hand-operable brake device attached to said shell for cooperation with said rotatable member, and a slidable member carried by said brake device, said slidable member normally fitting between said spool and rotatable member to hold said spool in place and releasing said spool when slid outwardly.

10. In a fishing reel, the combination of a line spool, a motor spring, a train of gears connecting said spring with said spool, a rotary element associated with said spool, means interposed between said element and said spool opposing the relative rotation of said spool in the direction only in which it is driven by said spring, a hand-operable brake device having a shoe for engagement with one side of said rotary element, and a slidable member carried by said brake device adapted for engagement with the opposite side of said rotary element, said slidable member when slid outwardly being removed from cooperative relationship with said rotary element.

11. In a fishing reel, the combination of a line spool, a motor spring, driving means between said spring and spool, a rotary element associated with said spool, means interposed between said element and said spool opposing the relative rotation of said spool in the direction only in which it is driven by said spring, a hand operable brake device having a shoe for engagement with one side of said rotary element, a slidable member carried by said brake device adapted for engagement with the opposite side of said rotary element, the outer end of said slidable member being bent at an angle to the body portion thereof, and a spring acting on said bent end which lifts said slidable member from engagement with said rotary element when said brake device is operated to remove said shoe from its braking engagement.

12. In a fishing reel, the combination of a line spool, a motor spring, driving means between said spring and said spool, a ratchet carried by said spool, a rotary element, pawls pivoted to said rotary element, said pawls having counter-weighted outer ends whereby the pawls are kept in engagement with the teeth of said ratchet by centrifugal force, and a hand operable brake controlling the rotation of said rotary element.

EMMETT B. PERRINE.